United States Patent
Brown et al.

(10) Patent No.: US 9,025,495 B1
(45) Date of Patent: May 5, 2015

(54) FLEXIBLE ROUTING ENGINE FOR A PCI EXPRESS SWITCH AND METHOD OF USE

(71) Applicant: PMC-Sierra US, Inc., Sunnyvale, CA (US)

(72) Inventors: David Alan Brown, Carp (CA); Peter Z. Onufryk, Flanders, NJ (US); Cesar Talledo, San Jose, CA (US)

(*) Notice: Subject to any disclaimer, the term of this patent is extended or adjusted under 35 U.S.C. 154(b) by 99 days.

(21) Appl. No.: 13/743,225

(22) Filed: Jan. 16, 2013

(51) Int. Cl.
| | |
|---|---|
| H04L 12/28 | (2006.01) |
| H04J 3/24 | (2006.01) |
| G06F 13/00 | (2006.01) |
| H04L 12/24 | (2006.01) |

(52) U.S. Cl.
CPC ..................... H04L 41/082 (2013.01)

(58) Field of Classification Search
USPC ................. 370/255, 235, 229, 230
See application file for complete search history.

(56) References Cited

U.S. PATENT DOCUMENTS

| 7,945,721 B1* | 5/2011 | Johnsen et al. ............... 710/311 |
| 8,223,745 B2* | 7/2012 | Johnsen et al. ............... 370/351 |
| 2004/0268015 A1* | 12/2004 | Pettey et al. ................. 710/313 |

* cited by examiner

*Primary Examiner* — Edan Orgad
*Assistant Examiner* — Sithu Ko
(74) *Attorney, Agent, or Firm* — Kenneth Glass; Molly sauter; Glass & Associates (57) ABSTRACT

A system and method are disclosed for a flexible routing engine in a PCIe switch. The system may include a switch manager that is enabled, through firmware, to configure one or more routing tables associated with a switch stack of a PCIe switch. The method may include receiving a configuration transaction layer packet at the switch manager of a PCIe switch, running firmware at the switch manager to identify a desired behavior of a switch stack of the switch and updating one or more routing tables associated with switch stack.

20 Claims, 10 Drawing Sheets

| Field | Register | Requirement | Implementation |
|---|---|---|---|
| SERR# Enable | Control Register | PCIe Base Specification | F/W: Modify Implicit Search Table |
| ISA Enable | | PCIe Base Specification | HW: Full Implementation |
| VGA Enable | | PCIe Base Specification | HW: Full Implementation |
| SERR# Enable | Command Register | PCIe Base Specification | F/W: Modify Implicit Search Table |
| I/O Space Enable | | Primary side of P2Ps UR/enable for I/O requests. | F/W: Modify IO Address Search Table |
| Memory Space Enable (MSE) | | Primary side of P2Ps UR/enable for I/O requests. Address routed messages always route. | F/W: Modify Memory Address Search Table and Modify Multicast Vector Enable |
| Bus Master Enable (BME) | | Secondary side of P2Ps UR/enable requests. Address routed messages always route. | F/W: Modify Memory Address Search Table and Modify Multicast Vector Enable |

FIG. 10A

| Field | Register | Requirement | Implementation |
|---|---|---|---|
| SERR# Enable | Command Register | PCIe Base Specification | F/W: Modify Implicit Search Table |
| I/O Space Enable | | Primary side of P2Ps UR/enable for I/O requests. | F/W: Modify IO Address Search Table |
| Memory Space Enable (MSE) | | Primary side of P2Ps UR/enable for I/O requests. Address routed messages always route. | F/W: Modify Memory Address Search Table and Modify Multicast Vector Enable |
| Bus Master Enable (BME) | | Secondary side of P2Ps UR/enable requests. Address routed messages always route. | F/W: Modify Memory Address Search Table and Modify Multicast Vector Enable |

FIG. 10B

FLEXIBLE ROUTING ENGINE FOR A PCI EXPRESS SWITCH AND METHOD OF USE

BACKGROUND OF THE INVENTION

Peripheral Component Interconnect Express (PCIe) is a third generation Input Output (3GIO) system that implements a serial, switched-packet, point-to-point communication standard at the system level. PCI Express has achieved many advantages over the prior shared bus system, such as quality of service (QoS), high speed peer-to-peer communication between external devices, adaptability, and low pin counts. The basic PCI Express architecture includes a root complex, optionally, a PCI Express switch, and PCI Express endpoints.

In the prior art implementation of a PCI Express switch for routing incoming data packets between root complex and endpoint devices, the transaction layer packet (TLP) routing functions of the switch are hard-coded into the switch. Hard-coding of the switch routing functions is performed during the initial silicon fabrication. If errors are made in the hard-coding of the routing functions during the fabrication process, new revisions of silicon are required to correct the errors. Additionally, if new routing function features are to be added to the device, it would be necessary to fabricate a new revision of the silicon to incorporate the new features. Fabricating new revisions of silicon is an expensive and time-consuming process which undesirably delays the device time-to-market. As the PCIe standard matures it may also be necessary to implement non-standard routing features that may not be included in the standard PCIe devices.

Thus, there is a need for a method and apparatus that will reduce the cost of implementing changes to the TLP routing function of the PCI Express device after initial fabrication of the silicon and that will also reduce the time delay required to implement the changes to the routing function. Additionally, there is a need in the art for implementing non-standard features of PCIe devices into a PCIe switch.

SUMMARY OF THE INVENTION

The present invention provides a system and method for a flexible routing engine in a switch for coupling a CPU to a plurality of I/O devices through a root complex. In a particular embodiment, the switch may be a PCIe switch operating in a PCIe switch fabric topology. In an additional embodiment, the switch may be a RapidIO switch operating in a RapidIO switch fabric topology.

A method for flexible routing in a switch may include receiving a configuration request transaction layer packet at a switch stack of the switch. In accordance with the present invention, a switch stack is port logic that implements the physical layer, data link layer, and transaction/application layer functions of the PCIe protocol. The configuration request transaction layer packet may be generated by a root complex coupled to the switch. The switch stack may then forward the configuration request transaction layer packet received to a switch manager of the switch. The switch manager may then interpret the configuration request transaction layer packet at the switch manager and update at least one table of the switch based upon the interpretation of the configuration request transaction layer packet by the switch manager. After updating the tables of the switch stack, the switch manager may then synthesize a configuration completion transaction layer packet and forward the configuration completion transaction layer packet to the root complex.

In a particular embodiment, the switch stack may implement a configuration space Type 0 header format and in an additional embodiment, the switch stack may implement a configuration space Type 1 header format.

In interpreting the configuration request transaction layer packet at the switch manager, the switch manager may run firmware to identify at least one desired behavior of the switch stack. After identifying the desired behavior, the switch manager may update a routing table, an ingress transaction layer packet editing table or an egress transaction layer packet editing table of the switch stack by writing the desired behavior into the tables.

In the present invention, a system for flexible routing in a switch may include a switch comprising two or more switch stacks, wherein the switch stacks may receive a configuration request transaction layer packet generated by a root complex coupled to the switch. The switch may further include a switch manager coupled to the switch stacks. The switch manager may receive a configuration request transaction layer packet forwarded from the switch stacks. The switch manager may interpret the configuration request transaction layer packet update at least one table of the switch stacks based upon the interpretation of the configuration request transaction layer packet by the switch manager. Upon updating the switch stacks, the switch manager may further generate a configuration completion transaction layer packet and may forward the configuration completion transaction layer packet to the root complex.

To update the tables of the switch stack, the switch manager may run firmware to identify at least one desired behavior of the switch stack and may then update a routing table, an ingress transaction layer packet editing table or an egress transaction layer packet editing table based upon the identified desired behavior of the switch stack.

These and other advantages of the present invention will become obvious to those of ordinary skill in the art after having read the following detailed description of the preferred embodiments, which are illustrated in the various drawing figures.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The present invention is applicable to a general or special purpose computing system wherein one or more root complexes are coupled to a central processing unit and are sharing a group of input/output devices through a common switch fabric. More specifically, the exemplary embodiments described herein are related to a routing mechanism for routing data when the switch fabric utilizes a PCI Express (PCIe) protocol.

Figure 1:
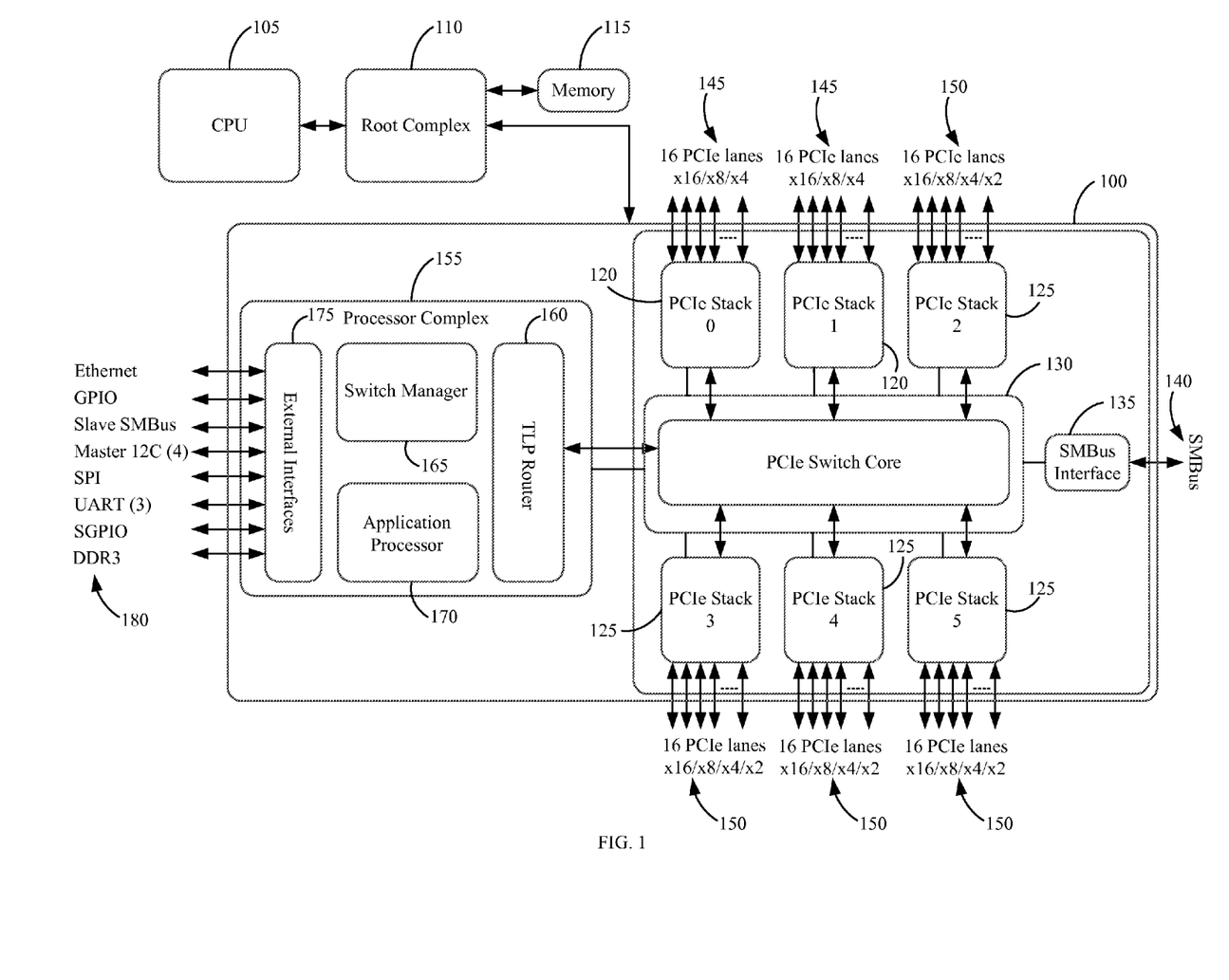
FIG. 1 is a block diagram illustrating a switch having a flexible routing engine in accordance with an embodiment of the present invention.

With reference to FIG. 1, a PCIe switch fabric topology is illustrated in which a root complex 110 of the PCIe system may communicate with multiple endpoints (i.e. I/O devices) of the system through a switch 100. The switch 100 may include a plurality of PCIe stacks 120, 125 coupled to a PCIe switch core 130 through which the root complex 110 may communicate with the endpoints. The endpoints may in turn communicate with the root complex 110 through the PCIe stacks 120, 125 of the switch 100 and additionally, the endpoints may communicate with other endpoints of the PCIe system through the PCIe stacks 120, 125.

In the illustrated embodiment, the PCIe stacks 120 may communicate with the various endpoints via a x16/x8/x4 symmetrical link 145 and the PCIe stacks 125 may communicate with the various endpoints via a x16/x8/x4/x2 symmetrical link 150. As is known in the art PCIe links include a pair of transmit and receive port links, commonly referred to as a lane. In accordance with the PCI Express Specification various combinations of operational lane widths are permitted to support a desired bandwidth.

The root complex 110 is the root of an I/O hierarchy that connects a central processing unit (CPU) 105 and a memory subsystem 115 to the I/O. The root complex 110 of the switch fabric may generate transaction requests to various endpoints initiated by the CPU 105. The memory subsystem 115 may additionally be coupled to the root complex 110 to facilitate the storage and retrieval of data required for the operation of the root complex 110 and the switch 100.

The switch core 130 may additionally be coupled to system management bus 140 through a system management bus interface 135. As is known in the art, a system management bus (SMBus) is a two-wire interface through which various system component chips can communicate with each other and with the rest of the switch fabric. The SMBus often provides a means for debug related communications.

PCIe transactions at the transaction layer may be identified as memory transactions, I/O transactions, configuration transactions or message transactions. Transactions at the transaction layer may include one or more transaction layer packet transmissions required to transfer information between a requester and a completer. In general any device can be a requestor or completer.

In a system utilizing a PCIe switch 100, before such transaction layer packets can be generated by a requester of the system to be accepted by a completer, the requester and the completer must be configured to insure compliance with the system transaction layer packet routing scheme. To configure the requester and completer devices, upon start-up of a PCIe switch 100, the software executing on the CPU 105 coupled to the PCIe switch may request that the root complex 110 initiate configuration transactions to read from or write to a configuration register of one or more of the PCIe stacks 120,125 coupled to the switch core 130. In the prior art, combinational logic that is controlled by configuration registers are implemented in hardware and the hardware registers are accessed by the root complex 110 to discover the presence of a particular function as well as to write to the hardware register to configure the function for standard operation. In the prior art, the root complex 110 transmits configuration transaction layer packets to the switch 100 to configure the functionality of a PCIe stack 120, 125. The configuration transaction layer packet may include a payload for programming a desired behavior into a register of the PCIe stack 120,125. Upon receipt of the configuration transaction layer packet at the PCIe stack 120, 125, the payload of the packet may be used to directly write the desired behavior into a hardware register of the PCIe stack 120,125. As such, in accordance with the prior art the hardware registers of the PCIe stacks 120, 125 include the standard registers that may be written to by the root complex 110 to modify their behavior.

In accordance with the present invention, the switch 100 may further include a switch manager 165 running firmware that is responsible for modifying the behavior of the PCIe stacks 120, 125 through the switch core 130.

As shown in FIG. 1, the switch 100 of the present invention may include a processor complex 155 comprising a switch manager 165 and a TLP (transaction layer packet) router 160. In operation, the configuration transaction layer packets from the root complex 110 may be intercepted and rerouted to the switch manager 165 through the switch core 130 and the TLP router 160. Upon receipt of the configuration transaction layer packet, the switch manager 165 may then run firmware to identify a desired behavior for one of the PCIe stacks 120, 125. Upon identification of the desired behavior, the switch manager may write to one or more tables in the PCIe stack 120, 125 to configure the PCIe stack for the desired behavior. In accordance with the present invention, the firmware associated with the switch manager may be updated at any time to correct fabrication errors in the switch 100 or to implement new features into the switch 100.

The processor complex may further include an application processor 170 which may enable additional functionality such as baseboard management control (BMC) and enclosure management capabilities. In operation, the configuration transaction layer packets from the root complex 110 may be intercepted and rerouted to the application processor 170 through the switch core 130 and the TLP router 160. Additionally, the processor complex may include an external interface 175 which may couple to various external protocols 180, including, but not limited to, Ethernet and DDR3.

Figure 2:
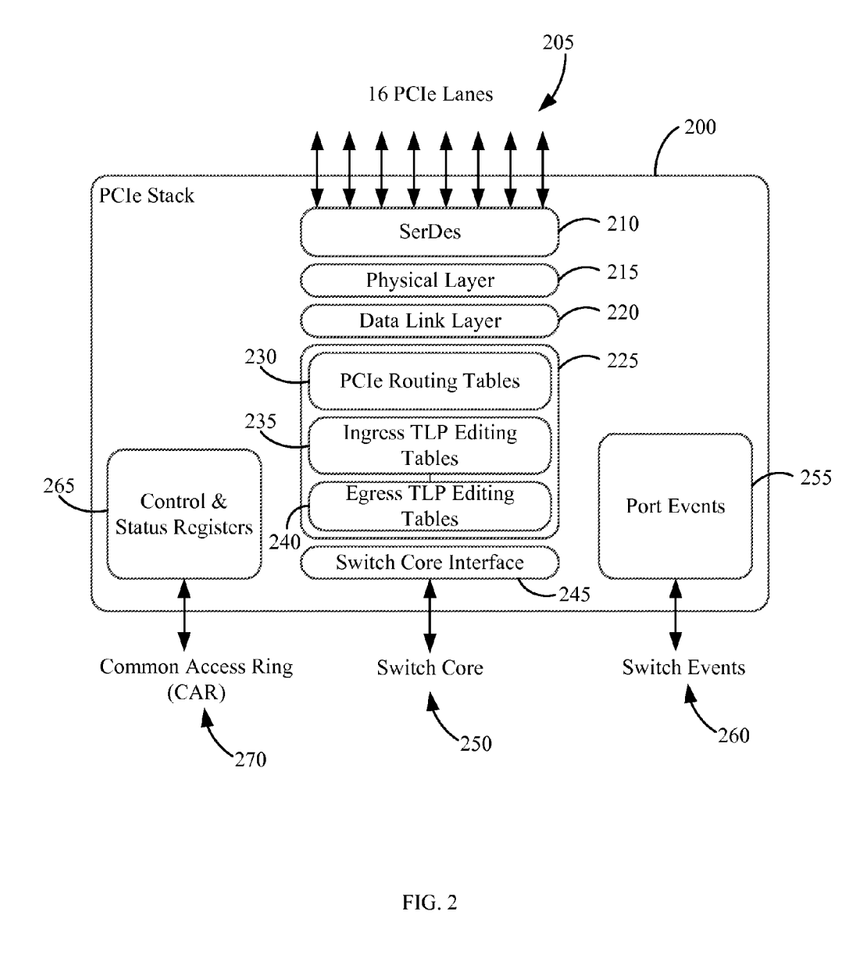
FIG. 2 is a block diagram illustrating a switch stack of a switch having a flexible routing engine in accordance with an embodiment of the present invention.

With reference to FIG. 2, a PCIe stack 200 in accordance with an embodiment of the present invention is illustrated in more detail. As shown in FIG. 2, the PCIe stack 200 may include various interfaces and communication layers. In this embodiment, the PCIe stack 200 may include a serializer/deserializer (SerDes) interface 210 coupled to an endpoint through the PCIe lanes 205. The SerDes 210 may communicate with a physical layer 215 of the PCIe architecture which may in-turn communicate with a data link layer 220 of the architecture. At the transaction layer 225, the routing of transaction layer packets through the PCIe stack may be controlled by PCIe routing tables 230, ingress TLP editing tables 235 and egress TLP editing tables 240. The PCIe stack may be configured by writing a desired behavior to the PCIe routing tables 230, ingress TLP editing tables 235 and egress TLP editing tables 240. In the present invention, the switch manager 165 runs firmware to identify a desired behavior for the PCIe stack and writes the desired behavior into the PCIe routing tables 230, ingress TLP editing tables 235 and egress TLP editing tables 240 to configure the switch. The PCIe stack 200 may communicate with the switch core 250 through the switch core interface 245. The PCIe stack 200 may further include a port events unit 255 to intercept switch events 260 for the PCIe stack 200 and a control and status register 265 to communicate with a common access ring (CAR) associated with the switch core 250.

In one embodiment of the present invention, there is one routing table 230 for each PCIe stack 200 and multiple ports in the same stack may share the same routing table 230. Additional embodiments are within the scope of the present invention, wherein the multiple routing tables 230 may be implemented and multiple PCIe stacks 200 may share common routing tables 230.

In accordance with the PCIe specification, configuration transaction layer packets (CFG TLPs) target the configuration space of the PCIe device to provide configuration and setup information for the device during enumeration. The PCIe specification defines two formats for the PCIe configuration headers used to configure a PCIe device. The two formats are referred to as type 0 and type 1 headers. Type 0 PCIe configuration headers do not contain a bus number and are interpreted by all devices as being for PCIe configuration addresses on the main PCIe bus. Alternatively, in order to address devices that are not on the main PCIe bus, type 1 PCIe configuration headers that contain a bus number can be used as a mechanism to allow PCIe-PCIe bridges to decide whether or not to pass configuration transaction layer packets from the main PCIe bus to a secondary PCIe bus to allow configuration of PCIe devices on the secondary PCIe bus. In the prior art, these headers were implemented in hardware registers that directly controlled the forwarding of the PCIe configuration transaction layer packets.

The PCIe stacks 200 of the present invention utilize both type 0 and type 1 headers, which are implemented in memory attached to the CPU running the switch firmware, instead of being hardware encoded into the switch 100. As such, upon receiving a type 0 configuration request transaction layer packet from the root complex 110 at a switch stack 200 of the switch 100, instead of updating the routing tables of the switch 225, the switch stack 200 may forward the type 0 configuration request transaction layer packet to the switch manager 165. The switch manager 165 may then interpret the type 0 configuration request transaction layer packet and update the routing tables 225 of the switch stack 200 to configure a PCIe device residing on the main PCIe bus. Additionally, upon receiving a type 1 configuration request transaction layer packet from the root complex 110 at a switch stack 200 of the switch, instead of updating the routing tables of the switch 225, the switch stack 200 may forward the type 1 configuration request transaction layer packet to the switch manager 165. The switch manager 165 may then interpret the type 1 configuration request transaction layer packet and update the routing tables 225 of the switch stack 200 to configure a PCIe device residing on a bus that is downstream of the main PCIe bus.

Figure 3:
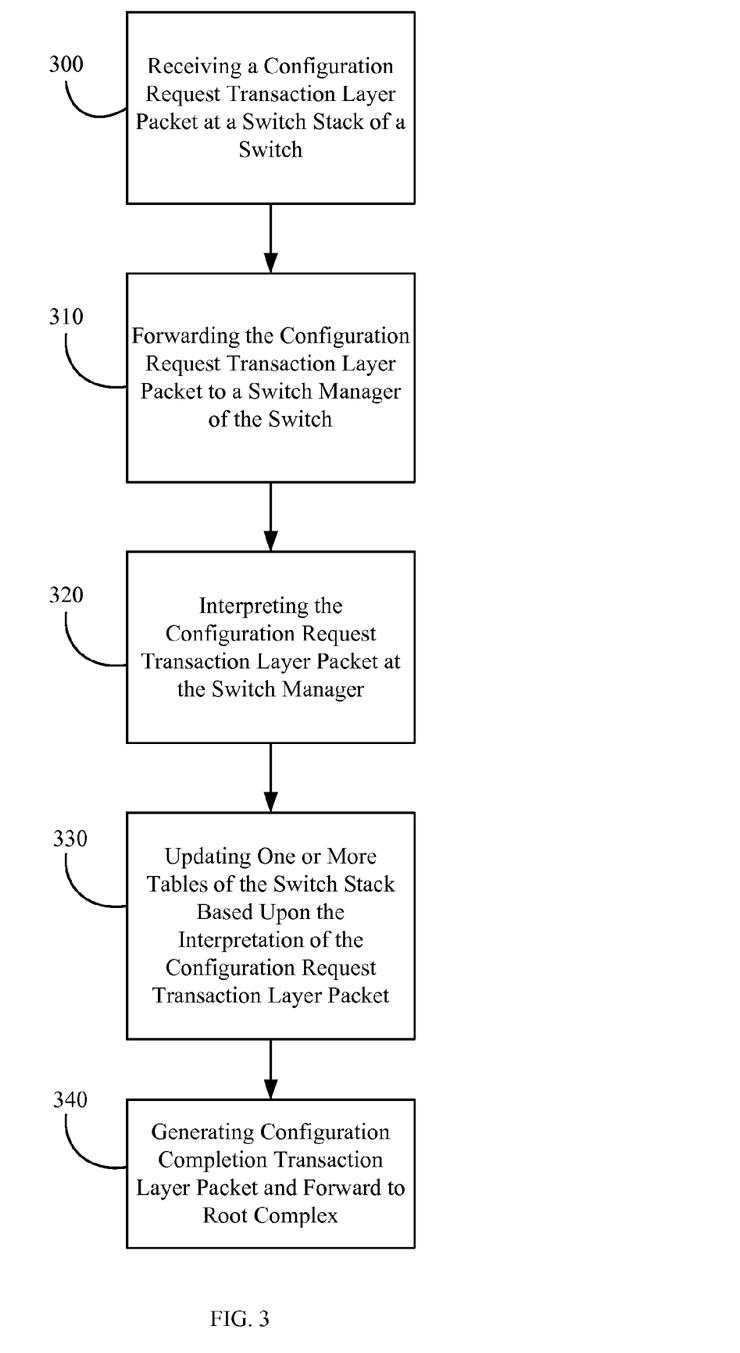
FIG. 3 is a flow diagram illustrating a method of flexible routing in a switch in accordance with an embodiment of the present invention.

With reference to FIG. 3, in general operation the present invention may receive a configuration request transaction layer packet at a switch stack of a switch 300. The configuration request transaction layer packet may then be forwarded to a switch manager of the switch 310. The switch manager may then interpret the configuration request transaction layer packet using firmware 320 and update one or more tables of the switch stack based upon the interpretation of the configuration request transaction layer packet 330. Upon completion of the table update, the switch manager may generate a configuration completion transaction layer packet and forward the packet to the root complex 340.

In a specific embodiment, the switch 100 may include six switch stacks 200, wherein each switch stack 200 may include various capabilities and the capabilities may vary among the six switch stacks 200. In a particular embodiment, each of the switch stacks 200 may comprise up to sixteen PCIe lanes 205 and the PCIe lanes 205 may further be identified as belonging to a port of the switch 100. The ports of the switch may be numbered and a routing table entry may be made for each of the ports of the switch. The port numbering may include an internal port for the switch manager 165 and an internal port for the application processor 170. In a particular embodiment, there may be at most eight ports in a stack, or sixteen ports on the virtual buses. The PCIe switch core and PCIe stacks can form one logical partition or act as a single PCIe switch. The PCIe switch core and PCIe stack may also be configured to act as multiple logical PCIe switches. Each logical switch is a partition, and each port belongs to a partition. In general, ports of the same stack that are in the same partition will have the same entries in the routing tables. In the present invention, routing tables are a stack resource and the routing tables are shared amongst the ports in a given stack. In addition to the routing established by the routing tables, there are also port based considerations to routing, including Access Control Services (ACS), multicast blocking, Bus Master Enable (BME), etc.

In accordance with the present invention, routing tables 230, ingress TLP editing tables 235 and egress TLP editing tables 240 are a stack resource and the tables are shared among the ports in a given switch stack 200. In the present invention non-multicast TLPs may be routed by ID, memory address, I/O address or implicitly and multicast TLPs may be routed utilizing a multicast vector. As such, the present invention may include an ID search table, a memory address search table, an IO search address search table, an implicit search table and multicast search tables. When the multicast tables are used, a multicast vector with each port as a bit is also used.

Figure 4:
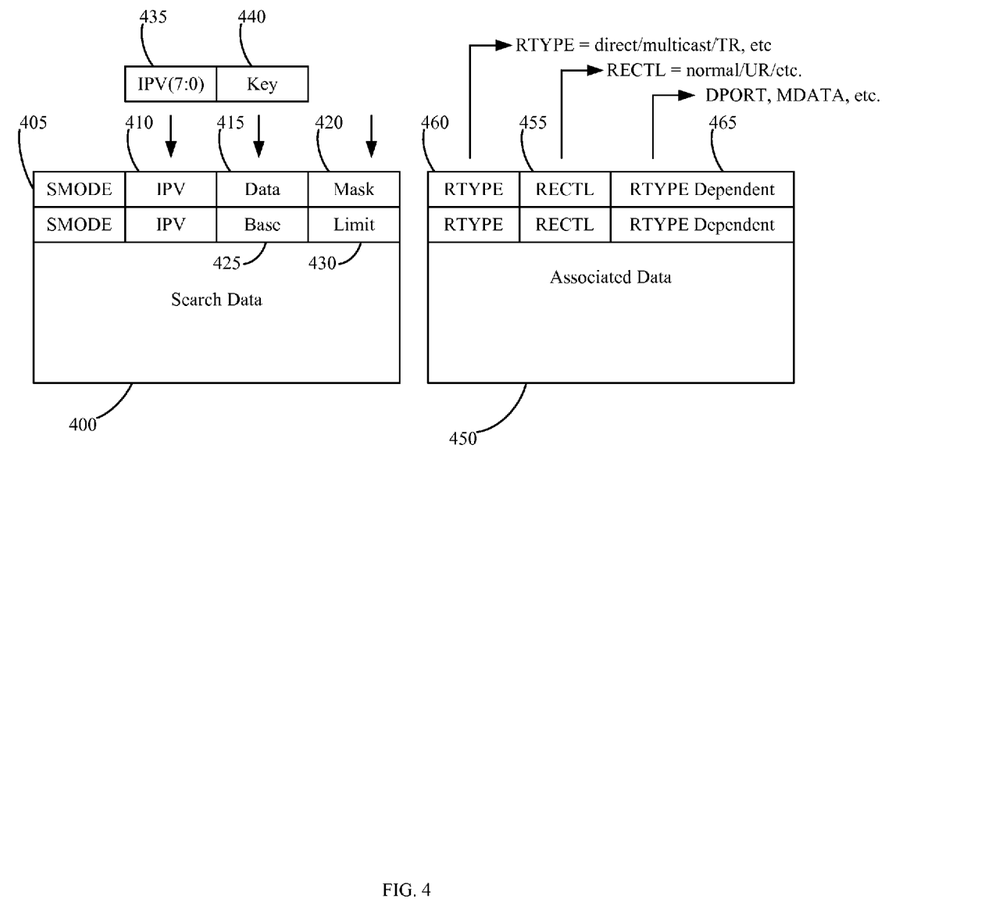
FIG. 4 is a diagram illustrating a generic search in accordance with an embodiment of the present invention.

In general, the routing tables of the present invention are searched as shown with reference to FIG. 4. As shown in FIG. 4, the search data 400 comprises the search mode (SMODE) 405, which is the search criteria (i.e. inside range) and the transaction layer packet (TLP) type that will match (i.e. posted). In the present invention, both criteria and TLP type must match. The search may also include the ingress port vector (IPV) 440 (i.e. within a stack) that the TLP was received on. The key 440, base address 425 limit address 430, data 415, mask 420 or other fields of the received TLP may further be included in the search data. The base address 425 and limit address 430 are the base and limit of the port in the case of a type 1 header, or in the case of a type 0 header, the base address 425 and the limit address 430 are header's base address register (BAR) expressed as a base and a limit. The common associated data 450 and routing exception control (RECTL) 455 are returned from the search to route the TLP. The routing type (RTYPE) 460 returned may be direct, multicast, translated, etc. The routing exception control (RECTL) 455 may include any exceptions to the normal routing. The routing exception control, (RECTL) is returned by the various search tables, as part of the associated data, to determine whether to route the TLP to the DPORT normally, or take some other action. The RECTL field is on a per IPV bit basis. For each IPV bit that is set there is a corresponding RECTL field associated with that bit. The routing type (RTYPE) dependent 465 may include the destination port or where to forward the TLP. A match in a search table occurs when all of the following are true, (1) the ingress port vector (IPV) bit is set for the port that the TLP was received on, (2) the received TLP type matches the TLP type and (3) the search criteria is met.

The combination of switch hardware and switch manager firmware provides for transparent switch operation in compliance with the PCIe 3.0 base specification. Transparent routing utilizes a flat address space, wherein the switch does not translate or modify the addresses of the packets it receives. The switch of the present invention provides for memory address routing, I/O routing, ID routing, implicit routing and multicast routing utilizing tables established and populated by the switch manager.

Figure 5:
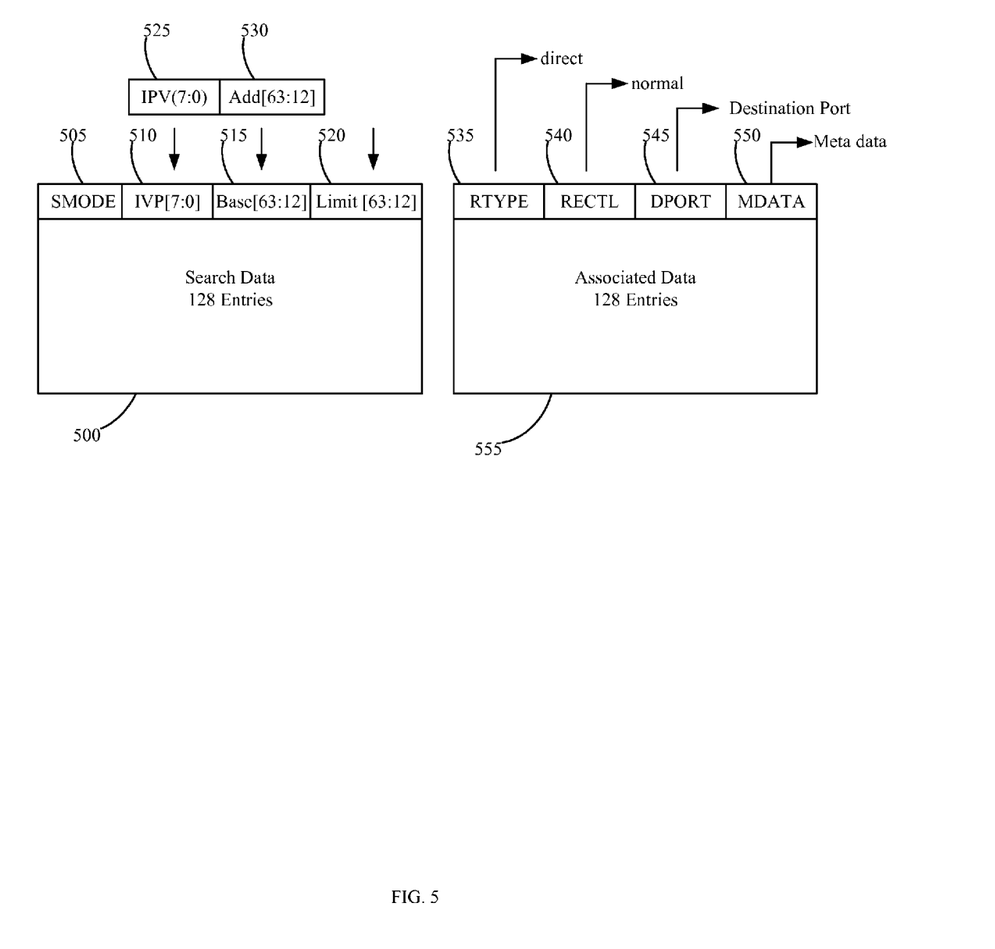
FIG. 5 is a diagram illustrating the memory address search table and memory address routing in accordance with the present invention.

With reference to FIG. 5, in memory address routing, memory requests and address routed messages are received at the switch and routed by address wherein the memory address search table is used to route the request. As shown in FIG. 5, the search data 500 of the memory address search table may include a search mode (SMODE) field 505, an ingress port vector (IPV) field 510, a base [63:12] field 515 and a limit [63:12] field 520. The address of the transaction layer packet 530, and the ingress port vector (IPV) may be used in the search of the memory address table. In this embodiment, all addresses in the table are treated as 64 bits with the top 32 bits zero filled as required. The associated data 555 resulting from the search match may include routing type (RTYPE) 535, routing exception control (RECTL) 540, destination port (DPORT) 545 and meta data (MDATA) 550. In memory address routing, the RTYPE=direct and the RECTL=normal. The destination port (DPORT) 545 number is used to forward the transaction layer packet to its destination. Memory address routing is not permitted to the port on which the TLP was received. If the DPORT equals in the ingress port, then the transaction layer packet is handled as an unsupported request and the error is logged for subsequent error handling by the system.

Figure 6:
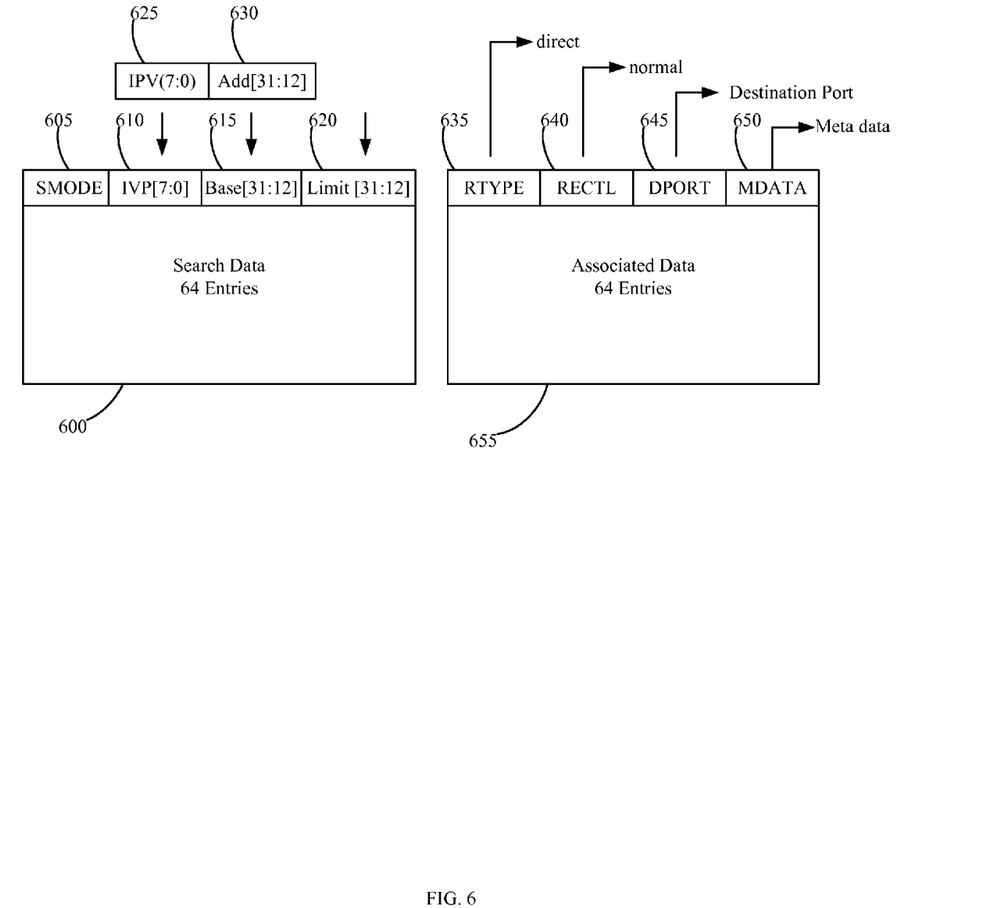
FIG. 6 is a diagram illustrating the I/O address search table and I/O address routing in accordance with the present invention.

With reference to FIG. 6, in I/O address routing, I/O requests are received at the switch and routed by I/O address wherein the I/O address search table is used to route the request. As shown in FIG. 6, the search data 600 of the I/O address search table may include a search mode (SMODE) field 605, an ingress port vector (IPV) field 610, a base [31:12] field 615 and a limit [31:12] field 620. The I/O address 630 and IPV 625 of the received request may be used to access the search data 600. The associated data 655 resulting from the match is read and may include routing type (RTYPE) 635, routing exception control (RECTL) 640, destination port (DPORT) 645 and meta data (MDATA) 650. In I/O address routing, RTYPE=direct and RECTL=normal. The destination port number retrieved from the I/O address search table associated data 655 is used to forward the transaction layer packet to its destination. I/O routing is not permitted to the port on which the transaction layer packet was received. If the DPORT equals the ingress port, then the transaction layer packet is handled as an unsupported request by hardware, and the error is logged for subsequent handling by the system.

Figure 7:
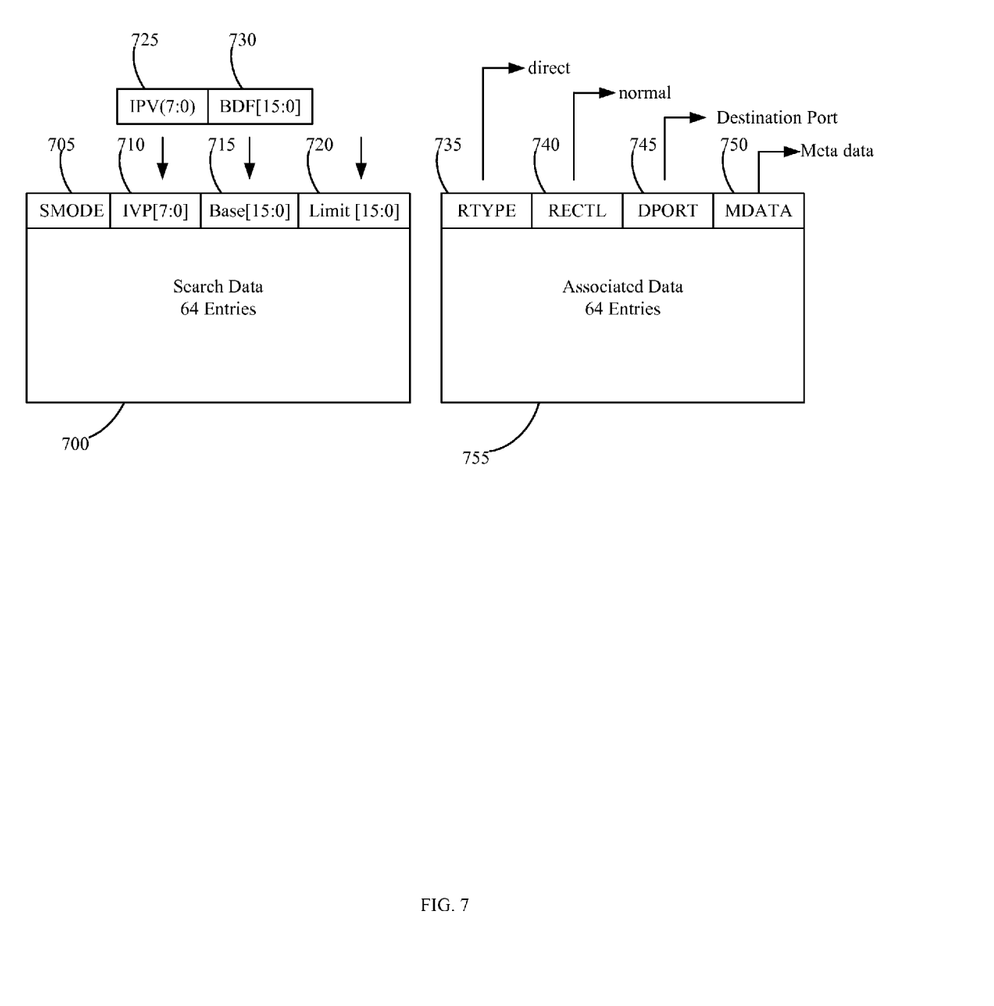
FIG. 7 is diagram illustrating the ID search table and ID address routing in accordance with the present invention.

With reference to FIG. 7, completions, type 1 configuration packets and some messages may be routed via ID routing. ID requests are received at the switch and routed by ID wherein the ID search table is used to route the request. In ID routing the bus, device, function (BDF) is used to access the ID search table. As shown in FIG. 7, the search data 700 of the ID search table may include a search mode (SMODE) field 705, an ingress port vector (IPV) field 710, a base [15:0] field 715 and a limit [15:0] field 720. The BDF [15:0] 730 and IPV 725 of the received request may be used to access the search data 700. The associated data 755 resulting from the match is read and may include routing type (RTYPE) 735, routing exception control (RECTL) 740, destination port (DPORT) 745 and meta data (MDATA) 750. In ID routing, RTYPE=direct and RECTL=normal. The destination port number retrieved from the ID search table associated data 755 is used to forward the transaction layer packet to its destination. ID routing is not permitted to the port on which the transaction layer packet was received. If the DPORT equals the ingress port, then the transaction layer packet is handled as an unsupported request by hardware, and the error is logged for subsequent handling by the system. In accordance with ID routing, a type 1 configuration transaction layer packets that target a downstream peer-to-peer (i.e. bus number=virtual bus) or other internal functions such as endpoints and translated ports are programmed by firmware to forward the packet to the switch manager for further processing. However, type 1 configuration transaction layer packets that target a secondary bus of a downstream peer-to-peer device are converted to type 0 configuration transaction layer packets by hardware of the switch. In converting the type 1 configuration transaction layer packets to type 0 configuration transaction layer packets, the type 1 configuration transaction layer packet ID that equals the base [15:0] and is thus equal to the secondary bus number. This attribute is a function of the Alternative Routing ID (ARI) being enabled. When ARI is enabled the device field is a "don't care". When ARI is disabled, the device field must be 0, if it is not 0, then the hardware generates an unsupported request.

Figure 8:
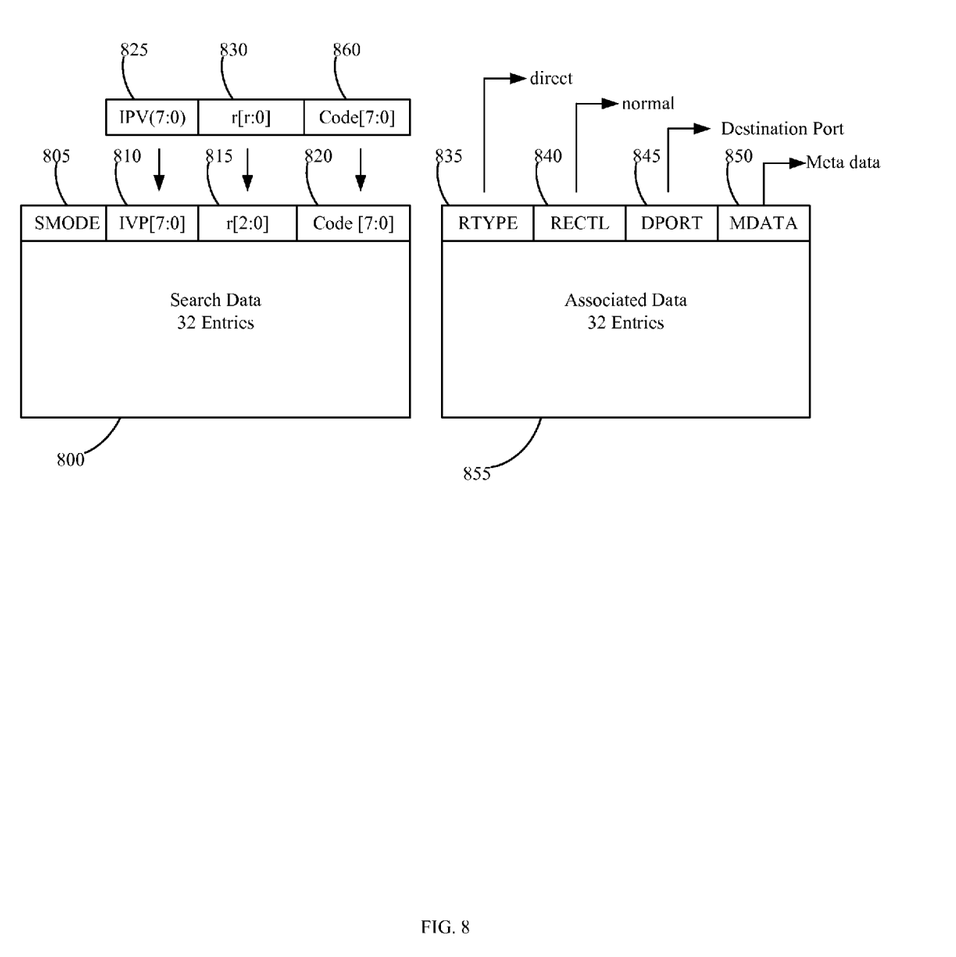
FIG. 8 is diagram illustrating the implicit search table and implicit routing in accordance with the present invention.

With reference to FIG. 8, most messages are implicitly routed and implicit requests are received at the switch and routed to their destination using the implicit search table. As shown in FIG. 8, the search data 800 of the implicit search table may include a search mode (SMODE) field 805, an ingress port vector (IPV) field 810, an r [r:0] field 815 and a code[7:0] field 820. The IPV 825, the r[r:0] field 830 and the code[7:0] field 860 of the received request may be used to access the search data 800. The associated data 855 resulting from the match is read and may include routing type (RTYPE) 835, routing exception control (RECTL) 840, destination port (DPORT) 845 and meta data (MDATA) 850. In implicit routing, RTYPE=direct and RECTL=normal. If the RTYPE=HW, the switch hardware is responsible for the transaction layer packet. The destination port number retrieved from the implicit search table associated data 855 is used to forward the transaction layer packet to its destination. Implicit routing is not permitted to the port on which the transaction layer packet was received. If the DPORT equals the ingress port, then the transaction layer packet is handled as an unsupported request by hardware, and the error is logged for subsequent handling by the system.

Figure 9:
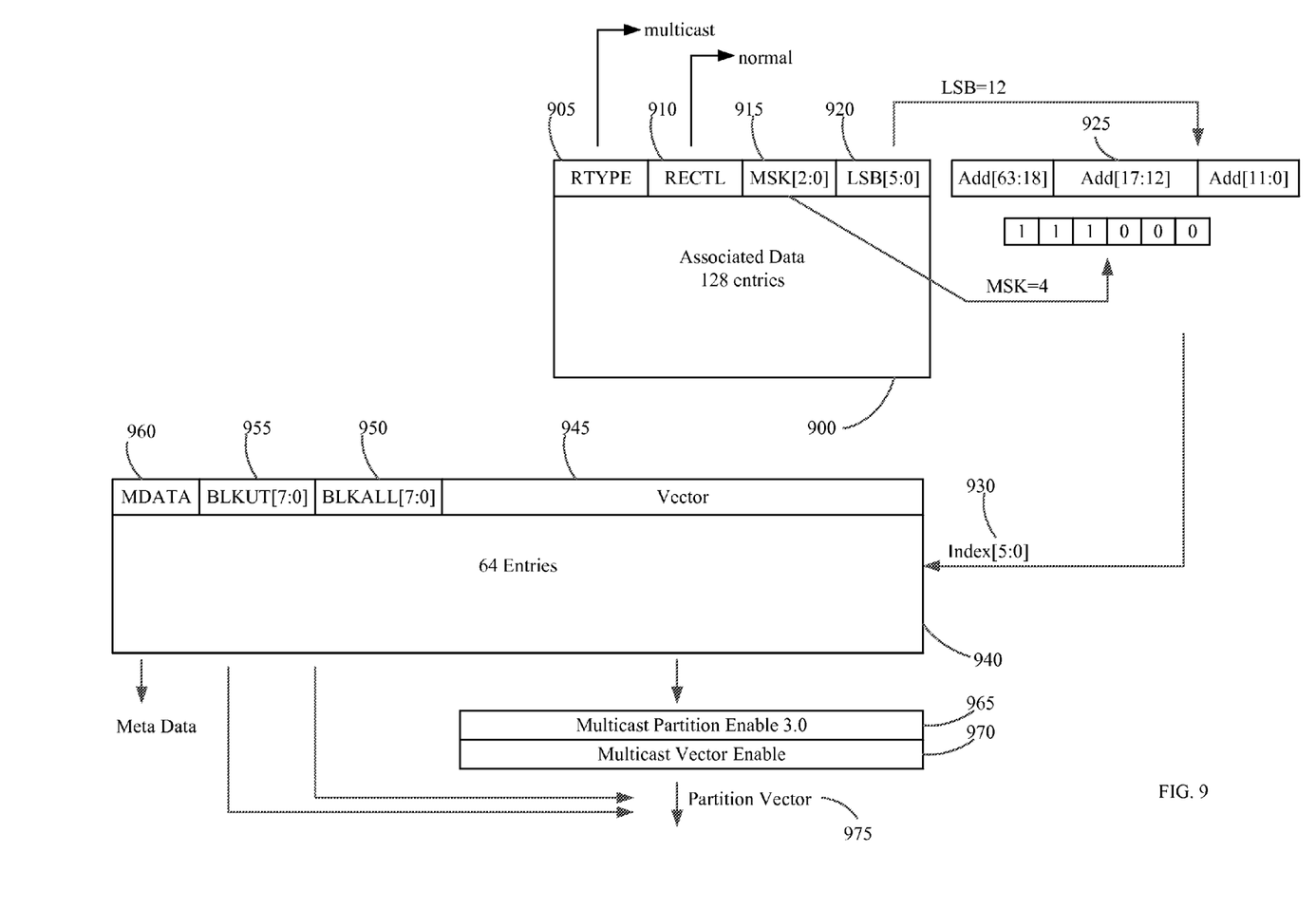
FIG. 9 is a diagram illustrating the multicast table and multicast routing in accordance with the present invention.

The switch of the present invention also provide for multicast routing. Multicast routing provides for the delivery of packets to a group of identified destinations. If the search of the memory address search table (previously described with reference to FIG. 5) yields an RTYPE=multicast, then multicast routing occurs within the ports of the switch. The PCIe specification defines multicast for posted requests routed by memory address (i.e. includes address routed messages). FIG. 9 illustrates the logical flow of multicast routing through the switch. The only access control service (ACS) check that applies to multicast is source validation (V). The multicast table associated data 900 may include an routing type (RTYPE) field 905, a routing exception control (RECTL) field 910, a mask (MSK[2:0]) field 915 and a least significant bit (LSB[5:0]) field 920. In operation of the multicast tables, the LSB (least significant bit) field 920 points to the portion of the request address that will be used to index the multicast table 940. In this exemplary embodiment, the LSB=12 and Add[17:12] 925 form the raw index. MSK[2:0] 915 is used to mask off bits in the raw index 925. In this exemplary embodiment, MSK=4 indicating that the index mask is 0b110000. The index to the multicast table is generated via index[5:0] =Add[17:12]|[110000], bitwise OR. The vector 945 is read from the multicast table 940, wherein each bit represents a port, including the switch manager 165 and application processor 170. The raw vector has a bit set for each port that is a member of the multicast group. Meta data 960 is read from the multicast table 940 to be sent to the switch manager 165 or application processor 170, if either is part of the vector 945. The raw vector is bitwise OR'd with the multicast partition enable [i] 965, where "i" is the partition number. The multicast table holds the superposition of all partition vectors 975. The raw vector is bitwise OR'd with the multicast vector enable 970, thereby removing ports that are not enabled to send transaction layer packets. The ingress port is removed from the vector 945 because multicasting to the ingress port is not allowed. If the BLKALL[7:0] bit 950 corresponds to the ingress port that the transaction layer was received on, the transaction layer packet is discarded and an error is flagged. The BLKALL bit represents which ingress ports are blocked from the multicast group. If the BLKUT[7:0] bit 955 corresponds to the ingress port that the transaction layer packet was received on, and the transaction layer packet has an untranslated address, the transaction layer packet is discarded and an error is flagged. The BLKUT bit represents which ingress ports are blocked from sending untranslated requests to the multicast group.

Figure 10A:
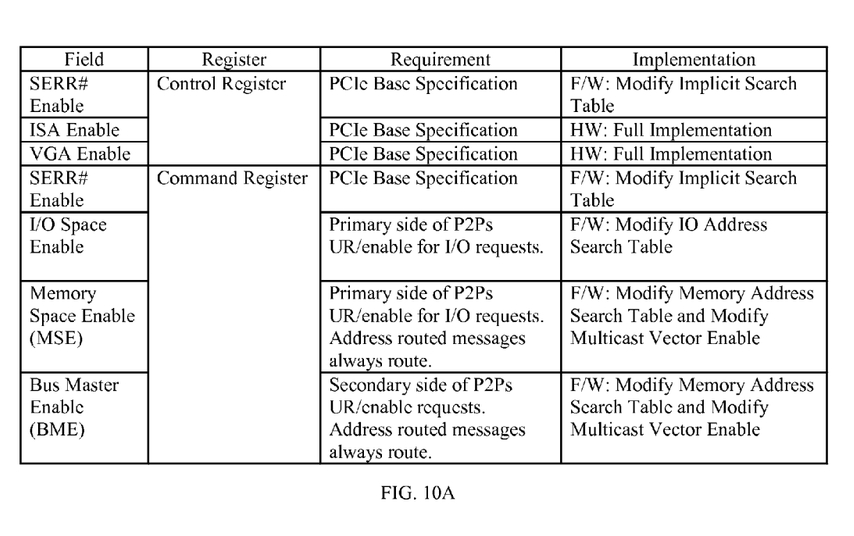
FIG. 10A is a table illustrating an implementation of the present invention for a type 1 configuration header.
Figure 10B:
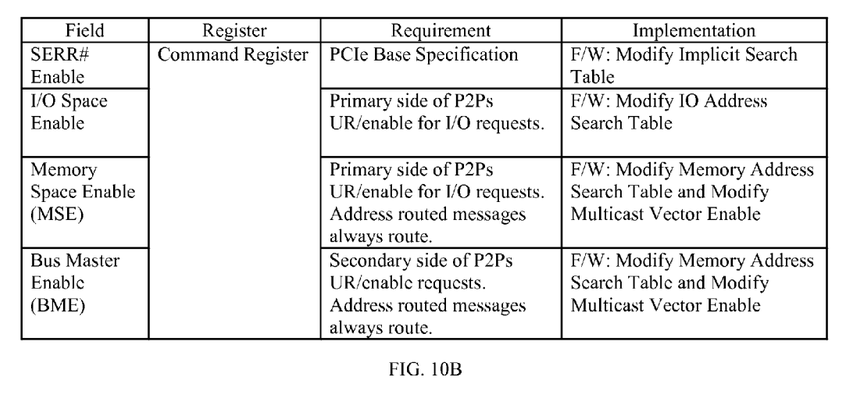
FIG. 10B is a table illustrating an implementation of the present invention for a type 0 configuration header.

In establishing the values within the routing tables to be searched, specific bits in the configuration headers are modified to affect the routing of the TLPs. In a specific embodiment, the bits affecting the routing of a type 1 header in accordance with the present invention are shown with reference to the table of FIG. 10A. In an additional embodiment, the bits affecting the routing of a type 0 header in accordance with the present invention are shown with reference to the table of FIG. 10B. As shown in the tables of FIG. 10A and FIG. 10B, in the present invention, firmware in the switch manager 165 modifies specific tables (i.e. implicit search table, memory address table, IO search table, etc.) associated with specific bits of the type 1 and type 0 headers in order to implement the desired routing of the TLPs through the switch fabric. In a specific example, the present invention utilizes firmware and the switch manager 165 to modify the memory address search table to implement routing control for the memory space enable (MSE) and base master enable (BME) bits of the header. As such, in the present invention, firmware is responsible for the MSE and BME bits in the type 1 and type 0 headers.

The switch manager of the present invention may also be used to interpret configuration transaction layer packets accessed from a memory mapped register in a base address register (BAR) of the switch. In a particular embodiment, the configuration space is mapped to a BAR (base address register) of the switch and a memory read/write is used as a configuration transaction layer packet request, which is then forwarded to the switch for interpretation. After the interpretation of the CFG TLP by the switch manager 165, memory read/write requests may be used to modify the registers and tables of the switch as previously described.

In accordance with the present invention, standard PCIe registers are exposed to the root complex via the configuration transaction layer packets (CFG TLPs). All CFG TLPs that target a function in the switch are forward to the switch manager and managed by firmware in combination with the switch hardware. In the present invention, the implementation cost of the tables is minimized to provide a simple behavior for the switch hardware to implement.

In various embodiments, the switch 100 is implemented in an integrated circuit of an integrated circuit device, which may include an integrated circuit package containing the integrated circuit. In some embodiments, the switch 100 is implemented in a single integrated circuit die. In other embodiments, the switch 100 is implemented in more than one integrated circuit die of an integrated circuit device which may include a multichip package containing the integrated circuit die.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method for flexible routing in a switch, the method comprising:
  receiving a configuration request transaction layer packet at a switch stack of the switch, the configuration request transaction layer packet generated by a root complex coupled to the switch;
  forwarding the configuration request transaction layer packet received at the switch stack to a switch manager of the switch, the switch manager comprising firmware;
  running the firmware of the switch manager to interpret the configuration request transaction layer packet to determine a desired behavior of the switch stack;
  implementing the desired behavior of the switch stack by updating at least one table of the switch stack based upon the determined desired behavior of the switch stack, the at least one table of the switch stack selected from the group consisting of a routing table, an ingress transaction layer packet editing table and an egress transaction layer packet editing table;
  determining that a change to the desired behavior of the switch stack is required;
  updating the firmware of the switch manager to reflect the change to the desired behavior of the switch stack;

running the updated firmware of the switch manager to interpret the configuration request transaction layer packet to determine a different desired behavior of the switch stack; and
implementing the different desired behavior of the switch stack by updating at least one table of the switch stack based upon the different desired behavior of the switch stack, the at least one table of the switch stack selected from the group consisting of a routing table, an ingress transaction layer packet editing table and an egress transaction layer packet editing table.

2. The method of claim 1, wherein the switch is a Peripheral Component Interconnect Express (PCIe) switch.

3. The method of claim 1, wherein the switch is a RapidIO switch.

4. The method of claim 1, wherein receiving the configuration request transaction layer packet further comprises receiving the configuration request transaction layer packet from a memory mapped base address register (BAR) of the switch.

5. The method of claim 1, further comprising:
generating a configuration completion transaction layer packet, the configuration completion transaction layer packet generated by the switch manager; and
forwarding the configuration completion transaction layer packet to the root complex.

6. The method of claim 1, wherein the switch stack implements a configuration space Type 0 header format.

7. The method of claim 1, wherein the switch stack implements a configuration space Type 1 header format.

8. The method of claim 1, wherein the switch stack the change to the desired behavior of the switch stack is a result of a fabrication error in the switch stack.

9. The method of claim 1, wherein the change to the desired behavior of the switch stack is a result of an implementation of a new feature into the behavior of the switch stack.

10. A system for flexible routing in a switch, the system comprising:
a switch comprising at least one switch stack, the at least one switch stack for receiving a configuration request transaction layer packet generated by a root complex coupled to the switch; and
a switch manager coupled to the at least one switch stack, the switch manager comprising firmware and the switch manager for receiving a configuration request transaction layer packet forwarded from the at least one switch stack, for running the firmware to interpret the configuration request transaction layer packet to determine a desired behavior of the switch stack, for implementing the desired behavior of the switch stack by updating at least one table of the at least one switch stack based upon the determined desired behavior of the switch stack, the at least one table of the switch stack selected from the group consisting of a routing table, an ingress transaction layer packet editing table and an egress transaction layer packet editing table, for updating the firmware of the switch manager to reflect a required change to the desired behavior of the switch stack, for running the updated firmware of the switch manager to interpret the configuration request transaction layer packet to determine a different desired behavior of the switch stack and implementing the different desired behavior of the switch stack by updating at least one table of the switch stack based upon the different desired behavior of the switch stack, the at least one table of the switch stack selected from the group consisting of a routing table, an ingress transaction layer packet editing table and an egress transaction layer packet editing table.

11. The system of claim 10, wherein the switch is a Peripheral Component Interconnect Express (PCIe) switch and wherein the at least one switch stack comprises a first switch stack having a plurality of tables selected from the group consisting of a routing table, an ingress transaction layer packet editing table and an egress transaction layer packet editing table, and comprises a second switch stack having a plurality of tables selected from the group consisting of a routing table, an ingress transaction layer packet editing table and an egress transaction layer packet editing table, the updating at least one table of the switch stack further comprising updating at least one of the tables of the first switch stack and updating at least one of the tables of the second switch stack.

12. The system of claim 10, wherein the switch is a RapidIO switch.

13. The system of claim 10, wherein the at least one switch stack further is for receiving the configuration request transaction layer packet from a memory mapped base address register (BAR) of the switch.

14. The system of claim 10, wherein the switch manager further is for generating a configuration completion transaction layer packet and for forwarding the configuration completion transaction layer packet to the root complex.

15. The system of claim 10, wherein the switch stack implements a configuration space Type 0 header format.

16. The system of claim 11, wherein the switch stack implements a configuration space Type 1 header format.

17. The system of claim 10, wherein the required change to the desired behavior of the switch stack is a result of a fabrication error in the switch stack.

18. The method of claim 10, wherein the required change to the desired behavior of the switch stack is a result of an implementation of a new feature into the behavior of the switch stack.

19. A switch comprising:
at least one switch stack, the at least one switch stack for receiving a configuration request transaction layer packet generated by a root complex coupled to the switch; and
a switch manager coupled to the at least one switch stack, the switch manager comprising firmware and the switch manager for receiving a configuration request transaction layer packet forwarded from the at least one switch stack, for running the firmware to interpret the configuration request transaction layer packet to determine a desired behavior of the switch stack, for implementing the desired behavior of the switch stack by updating at least one table of the at least one switch stack based upon the determined desired behavior of the switch stack, the at least one table of the switch stack selected from the group consisting of a routing table, an ingress transaction layer packet editing table and an egress transaction layer packet editing table, for updating the firmware of the switch manager to reflect a required change to the desired behavior of the switch stack, for running the updated firmware of the switch manager to interpret the configuration request transaction layer packet to determine a different desired behavior of the switch stack and implementing the different desired behavior of the switch stack by updating at least one table of the switch stack based upon the different desired behavior of the switch stack, the at least one table of the switch stack selected from the group consisting of a routing table, an ingress transaction layer packet editing table and an egress transaction layer packet editing table.

20. The switch of claim 19, wherein the switch is a Peripheral Component Interconnect Express (PCIe) switch and wherein the at least one switch stack comprises a first switch stack having a plurality of tables selected from the group consisting of a routing table, an ingress transaction layer packet editing table and an egress transaction layer packet editing table, and comprises a second switch stack having a plurality of tables selected from the group consisting of a routing table, an ingress transaction layer packet editing table and an egress transaction layer packet editing table, the updating at least one table of the switch stack further comprising updating one at least one of the tables of the first switch stack and updating at least one of the tables of the second switch stack.

* * * * *

UNITED STATES PATENT AND TRADEMARK OFFICE
CERTIFICATE OF CORRECTION

| | |
|---|---|
| PATENT NO. | : 9,025,495 B1 |
| APPLICATION NO. | : 13/743225 |
| DATED | : May 5, 2015 |
| INVENTOR(S) | : David Alan Brown et al. |

It is certified that error appears in the above-identified patent and that said Letters Patent is hereby corrected as shown below:

In the Claims

Claim 8, column 11, line 32, delete the phrase "the switch stack".

Signed and Sealed this
Tenth Day of November, 2015

Michelle K. Lee
*Director of the United States Patent and Trademark Office*